United States Patent
Matthys

(10) Patent No.: US 11,099,064 B2
(45) Date of Patent: Aug. 24, 2021

(54) LIGHT EXPOSURE TRACKING SYSTEM, DEVICE, AND METHODS

(71) Applicant: ECLIPSE Rx, LLC, Riverside, MO (US)

(72) Inventor: Brian M. Matthys, Riverside, MO (US)

(73) Assignee: ECLIPSE Rx, LLC, Riverside, MO (US)

(*) Notice: Subject to any disclaimer, the term of this patent is extended or adjusted under 35 U.S.C. 154(b) by 0 days.

(21) Appl. No.: 16/639,380

(22) PCT Filed: Aug. 17, 2018

(86) PCT No.: PCT/US2018/046874
§ 371 (c)(1),
(2) Date: Feb. 14, 2020

(87) PCT Pub. No.: WO2019/036589
PCT Pub. Date: Feb. 21, 2019

(65) Prior Publication Data
US 2021/0148754 A1    May 20, 2021

Related U.S. Application Data

(60) Provisional application No. 62/687,048, filed on Jun. 19, 2018, provisional application No. 62/547,487, filed on Aug. 18, 2017.

(51) Int. Cl.
*G01J 1/42* (2006.01)
*G01J 1/02* (2006.01)
*H04B 1/3827* (2015.01)

(52) U.S. Cl.
CPC ............ *G01J 1/429* (2013.01); *G01J 1/0219* (2013.01); *H04B 1/385* (2013.01); *G01J 1/0247* (2013.01); *G01J 2001/4266* (2013.01)

(58) Field of Classification Search
CPC ........ G01J 1/429; G01J 1/0219; G01J 1/0247; G01J 2001/4266; H04B 1/385
See application file for complete search history.

(56) References Cited

U.S. PATENT DOCUMENTS

| | | |
|---|---|---|
| 8,180,591 B2 | 5/2012 | Yuen et al. |
| 8,852,127 B2 | 10/2014 | Bell et al. |
| 9,068,887 B1 | 6/2015 | Bennouri et al. |

(Continued)

OTHER PUBLICATIONS

International Search Report and Written Opinion in corresponding PCT/US2018/046874, dated Oct. 19, 2018.

(Continued)

*Primary Examiner* — Kiho Kim
(74) *Attorney, Agent, or Firm* — Hovey Williams LLP

(57) ABSTRACT

A system for monitoring ultraviolet (UV) exposure of a wearer. The system comprises a wearable device operable to sense UV radiation levels to which the wearer is exposed, and to transmit UV radiation information. The system further comprises an external computing device in remote communication with the wearable device, operable to receive the UV radiation information from the wearable device and configured to determine the wearer's real-time UV index value and the wearer's daily cumulative percentage of minimal erythema dose based upon the UV radiation information.

23 Claims, 10 Drawing Sheets

(56) References Cited

U.S. PATENT DOCUMENTS

| | | |
|---|---|---|
| 2005/0236576 A1 | 10/2005 | Yagi |
| 2007/0073487 A1* | 3/2007 | Albright .................. G01J 1/02 702/3 |
| 2012/0326046 A1 | 12/2012 | Aslam et al. |
| 2014/0061486 A1 | 3/2014 | Bao et al. |
| 2015/0102208 A1 | 4/2015 | Appelboom et al. |
| 2015/0177056 A1 | 6/2015 | Lian et al. |
| 2015/0338273 A1 | 11/2015 | Emadi et al. |
| 2015/0342527 A1 | 12/2015 | Karnik et al. |
| 2016/0154952 A1 | 6/2016 | Venkatraman et al. |
| 2016/0313176 A1 | 10/2016 | Lee |
| 2017/0038250 A1 | 2/2017 | Maass et al. |

OTHER PUBLICATIONS

SunSprite, "Personal Light Tracker. Improve Your Energy, Sleep and Mood", 2016, https://www.sunsprite.com/.

Silicon Labs, "Adding UV Sensing to Wearables & Consumer Applications", 2014, https://www.silabs.com/documents/public/white-papers/adding_uv_sensing.pdf.

Supplementary Search Report in corresponding European Patent Application Serial No. 18846997.7, dated May 4, 2021.

Amini, et al., "A Wireless Embedded Device for Personalized Ultraviolet Monitoring", Jan. 1, 2009, available at: URL:http://nrtweb.cs.ucla.edu/publication/download/481/Biodevices_Paper.pdf.

McKenzie, et al., "UV Radiation: Balancing Risks and Benefits", Photochemistry and Photobiology, 2009, 85, pp. 88-98.

\* cited by examiner

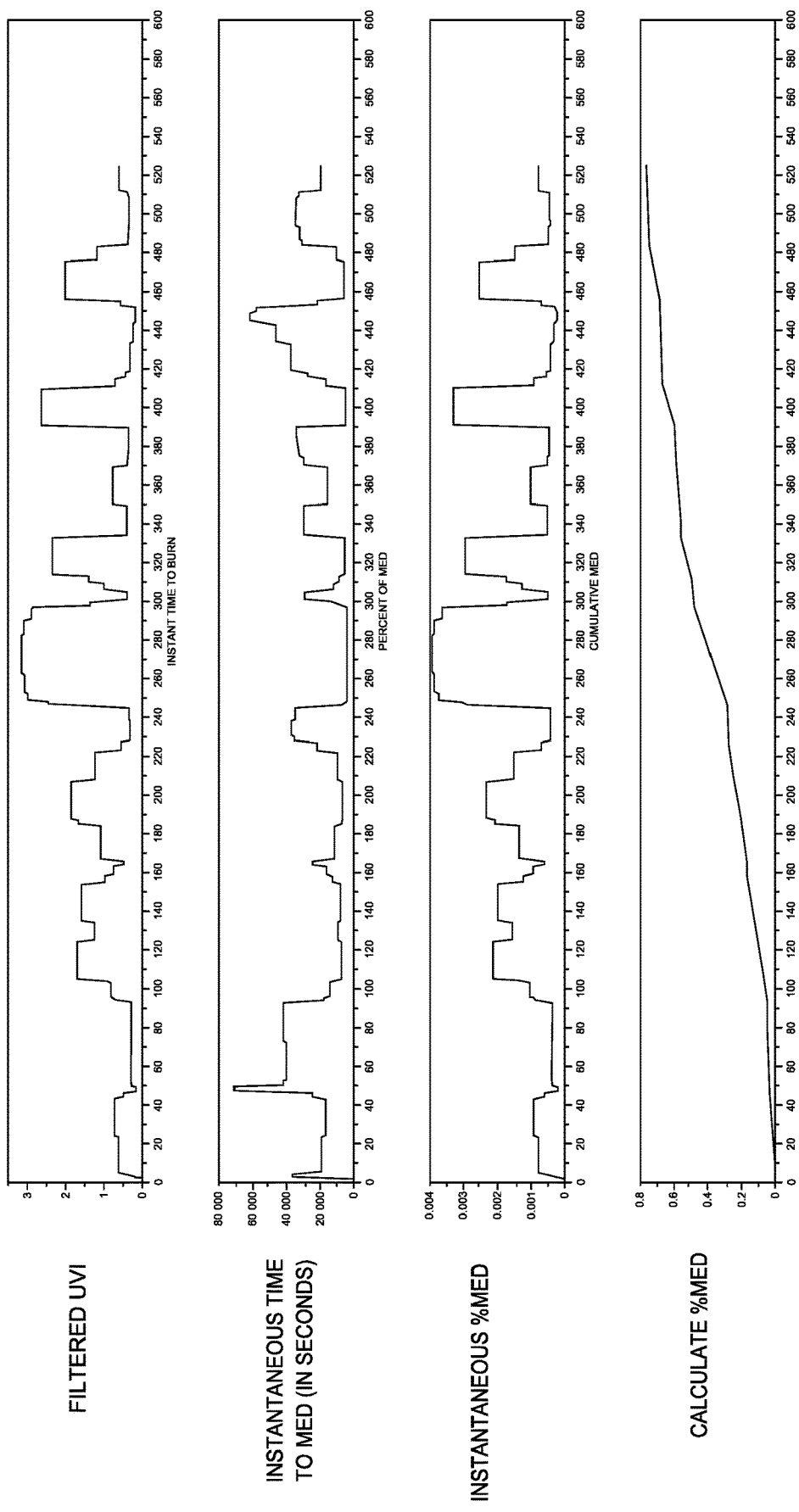

LIGHT EXPOSURE TRACKING SYSTEM, DEVICE, AND METHODS

CROSS-REFERENCE TO RELATED APPLICATIONS

The present application is the U.S. National Stage of International Patent Application No. PCT/US2018/046874, filed Aug. 17, 2018, which claims the priority benefit of U.S. Provisional Patent Application Ser. No. 62/687,048, filed Jun. 19, 2018, entitled LIGHT EXPOSURE TRACKING SYSTEM, DEVICE, AND METHODS, and Ser. No. 62/547,487, filed Aug. 18, 2017, entitled SUN EXPOSURE AND STEPS TRACKING SYSTEM, DEVICE, AND METHODS, each of which is incorporated by reference in its entirety herein.

BACKGROUND OF THE INVENTION

Field of the Invention

Embodiments of the present invention are directed to systems, devices, and methods for tracking sun and other light exposure. In more detail, embodiments of the present invention are directed a wearable device, which may be used as part of systems and methods for tracking and/or otherwise monitoring sun and other light exposure with respect to a wearer of the wearable device.

Description of Related Art

Sunlight exposure is associated with wide-ranging health risks. Some health risks resulting from certain sun exposure include cosmetic and/or premature ageing issues, such as skin wrinkles and pigmentation problems. More problematic, however, prolonged exposure to sunlight is known to cause skin cancer, such as the deadly malignant melanoma.

Individuals are becoming more cognizant of health risks related to sun exposure. To combat such health risks, many individuals try to avoid prolonged exposure to sunlight and/or attempt to use appropriate amounts of sunscreen. Nevertheless, it can be difficult to accurately establish how much sunlight an individual is exposed to during a given time period. For instance, a person enjoying an hour at the beach could be exposed to significantly different sunlight intensities depending on the time of day, weather conditions, geolocation (e.g., latitude/altitude), amount and type of sunscreen worn, and the clothing worn. In addition, to reduce the chance of to sun-related damage, individuals with lighter or fairer skin should generally try to be exposed to less amounts of sunlight than those individuals with darker skin. Furthermore, individuals are often exposed to sunlight in unexpected environments. For instance, individuals riding in vehicles can be exposed to significant levels of sunlight that pass through the windows of such vehicles. Similarly, individuals working interior office spaces near windows or skylights can also be exposed to significant levels of sunlight.

Thus, as briefly discussed above, it is inherently difficult to precisely monitor, track, and/or analyze the amount of sun or other light that to which an individual is exposed during any given period of time. Such precision is an important factor in providing accurate information to individuals as to how such individuals can adequately protect themselves from prolonged exposure to sun or other light.

SUMMARY

Embodiments of the present invention include a system for monitoring ultraviolet (UV) exposure of a wearer. The system comprises a wearable device operable to sense UV radiation levels to which the wearer is exposed, and to transmit UV radiation information. The system further comprises an external computing device in remote communication with the wearable device, operable to receive the UV radiation information from the wearable device and configured to determine the wearer's real-time UV index value and the wearer's daily cumulative percentage of minimal erythema dose based upon the UV radiation information.

Embodiments of the present invention additionally include a method of monitoring ultraviolet ("UV") exposure of a wearer. The method comprises a step of detecting UV radiation levels to which the wearer is exposed via a wearable device worn by the wearer. The wearable device comprises a UV sensor to yield UV radiation information. An additional step includes transmitting the UV radiation information to an external computing device. An additional step includes receiving through a user interface the wearer's skin type and sunscreen protection factor information for the wearer. A further step includes presenting on a display of the external computing device the wearer's real-time UV index value and the wearer's daily cumulative percentage of minimal erythema dose based upon the UV radiation information, skin type, and sunscreen protection factor information.

The present invention further includes an additional embodiment of a system for monitoring ambient light exposure of a wearer. The system comprises a wearable device operable to sense ambient light levels to which the wearer is exposed, and to transmit ambient light information. The system additionally comprises an external computing device in remote communication with the wearable device, operable to receive the ambient light information from the wearable device and configured to determine the wearer's ambient light exposure and the wearer's daily cumulative ambient light exposure level based upon the ambient light information.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein:

FIG. 10 is a series of graphs showing exemplary data collected from a two-hour time period from a wearable device according to embodiments of the present invention.

Figure 1:
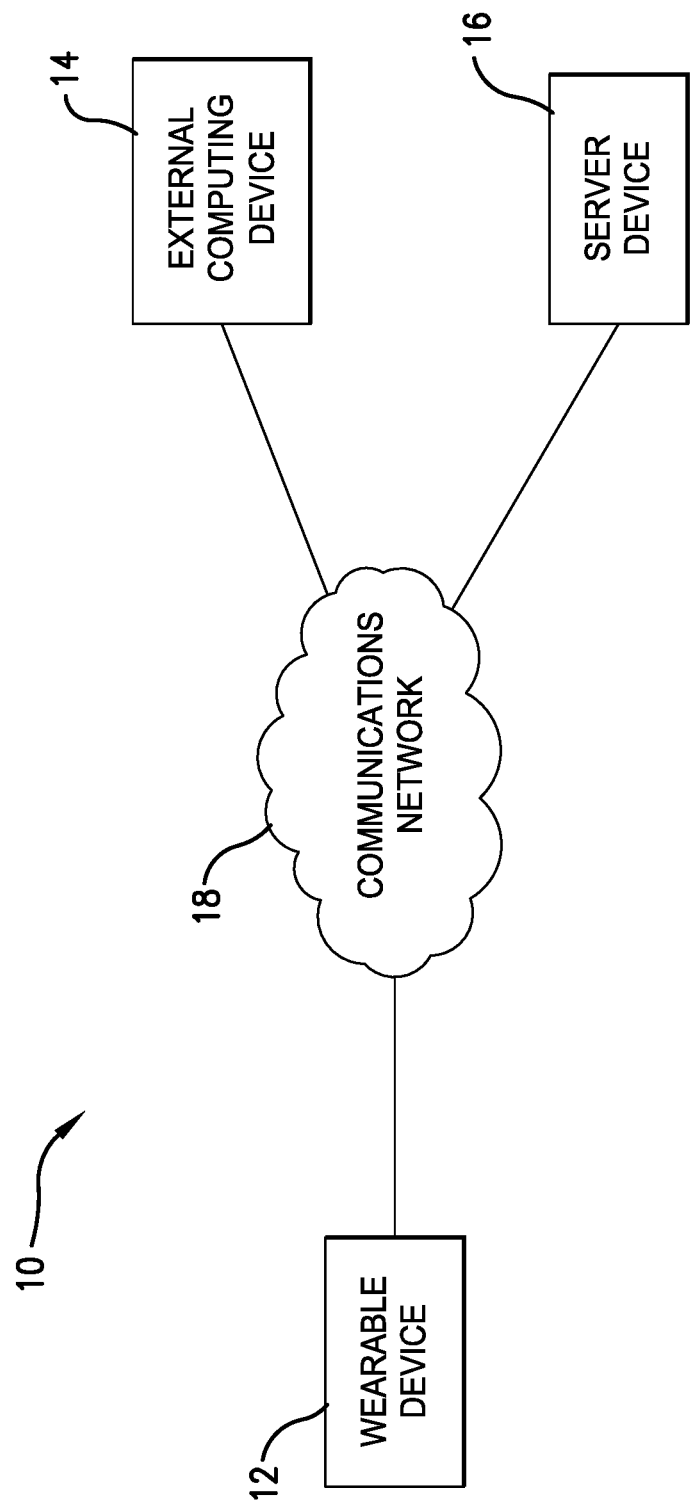
FIG. 1 is a schematic view of a system for tracking and/or monitoring light exposure of a user according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention are directed to a system, a device and/or a method for collecting and/or analyzing data, such as for tracking and/or monitoring sun and other light exposure of an individual. Broadly, and as will be discussed in more detail below, the inventive system may comprise a wearable device and one or more external computing devices, which may be in communication with each other over a communications network. In some embodiments, the system may also include one or more server devices, which may be in communication with the wearable device and/or the external computing device over the communications network.

The wearable device may comprise generally any type of wearable device, such as a device that may be worn on a wearer's wrist or other body part. The wearable device may be in the form of a water-resistant, light and/or steps measuring device capable of tracking sun and light exposure so as to prevent sun damage, such as sunburns and photoaging (e.g., wrinkles and pigmentation issues). The wearable device may include a solar panel, a rechargeable battery, an accelerometer, ultraviolet ("UV") sensors, RGB sensors, infrared sensors, and a vibratory motor. As such, the wearable device is configured to detect and measure UV light (both "UVA" and "UVB"), Infrared 1 light, Infrared 2 light, and/or ambient light (red, green, and blue). The wearable device may also track the steps of the wearer of the wearable device (referred to herein as the "wearer" or "user"), as well as other relevant parameters (e.g., calories, sleep patterns, etc.). In some embodiments, the wearable device may be solar powered and rechargeable (e.g., via a rechargeable battery). The device may be worn on the wrist, as a clip-on, etc.

In some embodiments, the wearable device may be included as part of the system (i.e., the wearable device, the external computing device, and/or the server device), which can be used to analyze any of the data or information collected by the wearable device. Based on such analysis, the system can provide information to the user regarding the UV index (i.e., sun strength) at any given time, and monitor timing and length of time of the user's exposure to UV, IR, and/or ambient light. The system can help the user avoid sunburns and/or photoaging by through use of a computer program stored on the wearable device, the external computing device, and/or the server device. In some embodiments, the computer program may provide an interactable user application, which can be accessible via a webpage (e.g., an online application) or via a mobile device (e.g., a "mobile app" on a smart phone). This user application can assist a user select their Fitzpatrick skin type. In alternative embodiments, the system 10 may include a camera or other devices, or a camera in tandem with other devices, to automatically detect the wearer's skin type. Similar components can be used to evaluate the wearer's skin for damage, sunburn, or disease (e.g., teledermatology). This user profile information (e.g., skin type and evaluation, or other of wearer characteristics) combined with monitoring light exposure at specific UV indexes, as performed by the wearable device or system, allows the system, e.g., via the wearable device and/or the external computing device running the application, to alert users prior to skin damage and sunburn or Minimal Erythemal Dose (MED) of UV light. Such features can decrease the risk of skin cancer or other skin damage. It can also be helpful for individuals with a photosensitive illness or who are taking medication increasing their sensitivity to light to avoid exacerbation of the condition. It will also inform the user of the various places UV exposure is encountered (e.g., vehicle, business office, lunch room, etc.) based on tracking separate UVA and UVB.

Embodiments of the present invention permit users to document when they received certain types of UV. For example, while driving with windows closed, UVA passes through glass while UVB does not. UVA and UVB both cause skin cancer, but users may be unaware that the UV exposure received through a car window may be the cause of their skin concerns. In addition, infrared radiation can pose skin concerns or other health risks. As 90% of wrinkles and pigment changes are due to sun exposure, the present invention will provide an optimum measuring tool to prevent against aging thereby helping individuals age well. The system may also track and monitor vitamin D production based on the amount of skin exposed during certain strengths of UV exposure. The higher the UV index the less skin that needs to be exposed to produce optimum vitamin D production.

As noted above, in addition to the wearable device, the system may include an external computing device and/or a server device, which may comprise generally any type of computing device with one or more processing elements and one or more memory elements. The memory elements may include the above-described computer program stored thereon. When executed, the computer program on the external computing device can instruct the one or more processing elements to obtain information from the wearable device regarding sun and/or light exposure, or other measured or detected parameters mentioned above. Those outputs from the wearable device can be displayed for the user either on the wearable device or on the external computing device (e.g., smartphone or other mobile device) that is providing the user application for interaction by the user. The outputs may be compared against a reference standard to generate an alert, such as an audible, visible, or vibrating alert, when a specified condition is encountered (e.g., too much sun exposure). The system can provide a number of alerts to the user, either in the wearable device itself or in the external computing device, either of which (or both) may be running the computer programs and/or providing the user application for interaction with the user/wearer. Alerts could be visual (e.g., light), auditory (e.g., chime or ring tone), vibration, or even SMS message. Alert events could include when too much sun exposure is reached, when to re-apply sunscreen, how long the user can be in sun without sunscreen, UV index level alerts, pollution level alerts (e.g., too much ozone), customizable sunscreen alerts, and/or ambient light alert for lack of light exposure putting the user at risk for seasonal affective disorder, or blue light alert (e.g., from computer, smart device, street light) putting the user at risk for circadian rhythm disorders, etc. The system may also provide information regarding how much and what kind (SPF level) of sunscreen to apply based upon monitoring, UV index, exposure time, and the user's profile information. The user may be able to input profile information into the device or application regarding various of the wearer characteristics, such as the wearer's skin type (e.g., Fitzpatrick skin type), eye color, and any sun-related medical history (e.g., skin cancer, sun sensitivity (i.e., polymorphous light eruption), and/or sun sensitivity due to interactions with certain medicines).

The system can provide various outputs for display to the user via the external computing device. Examples include a graph of daily exposure details—time of day, UV index comparison, times of day to avoid sun exposure based upon forecasted UV index, and/or a sun exposure report (including UV light, ambient light, and/or infrared light) to share with doctor. The system may also provide monitoring of multiple people from the same user application, which may be useful for parents for monitoring and/or receiving alerts related to sun exposure of their children. If the user experiences a sunburn, the system may provide for an interface in which the user responds to a series of questions to adjust the user profile setting to avoid further sunburn.

If the user gets sunburned, this information may be entered into the user application. The application instructs the processing elements to prompt the user to answer a series of questions to adjust settings, values, and internal reference standards to avoid future sunburn. This may include re-evaluating the user's Fitzpatrick skin type or other algorithmic type settings.

The system may also include a geolocation function to monitor exposure and risk based upon weather and location information.

Using the user application, the user will be able to identify their Fitzpatrick Skin Type (e.g., 1-6). Their skin type will be the basis of the amount of time they can proceed outdoors without sunburn. Application of specific sun protection factor ("SPF") (e.g., sunscreen) will allow for longer UV exposure times, and can support application of different SPF values for different body parts (e.g., 50 SPF on face, 30 SPF on body, etc.) In addition, the use of sun protective (UPF) clothing can provide the wearer with protection from sun and other light so as to allow for longer UV exposure time. The user application can educate users on the appropriate amount of SPF to use based on the fingertip unit approach. By doing this, it will also help users to reapply sunscreen before they get sunburned. Alternatively, the application can be paired with an internet webpage to include information and education about sun exposure risks.

The user application may also have the ability to provide information about vitamin D intake, and sleep compared to ambient light exposure that may interfere with sleep habits.

The system may provide a SkinScore™ based on the skin type, SPF use and UV index associated with Sun Exposure. This scale of 1-10 where 10 is the most dangerous score and one is the best will be calculated by the external computing device via operation of the processor executing the computer program of embodiments of the present invention. Other components such as average sun exposure by geolocation (altitude and latitude) may be added to the score. Additional sensor information that may be collected by the wearable device may include pollution exposure (e.g., ozone), and other types of light exposure discussed above.

Figure 2:
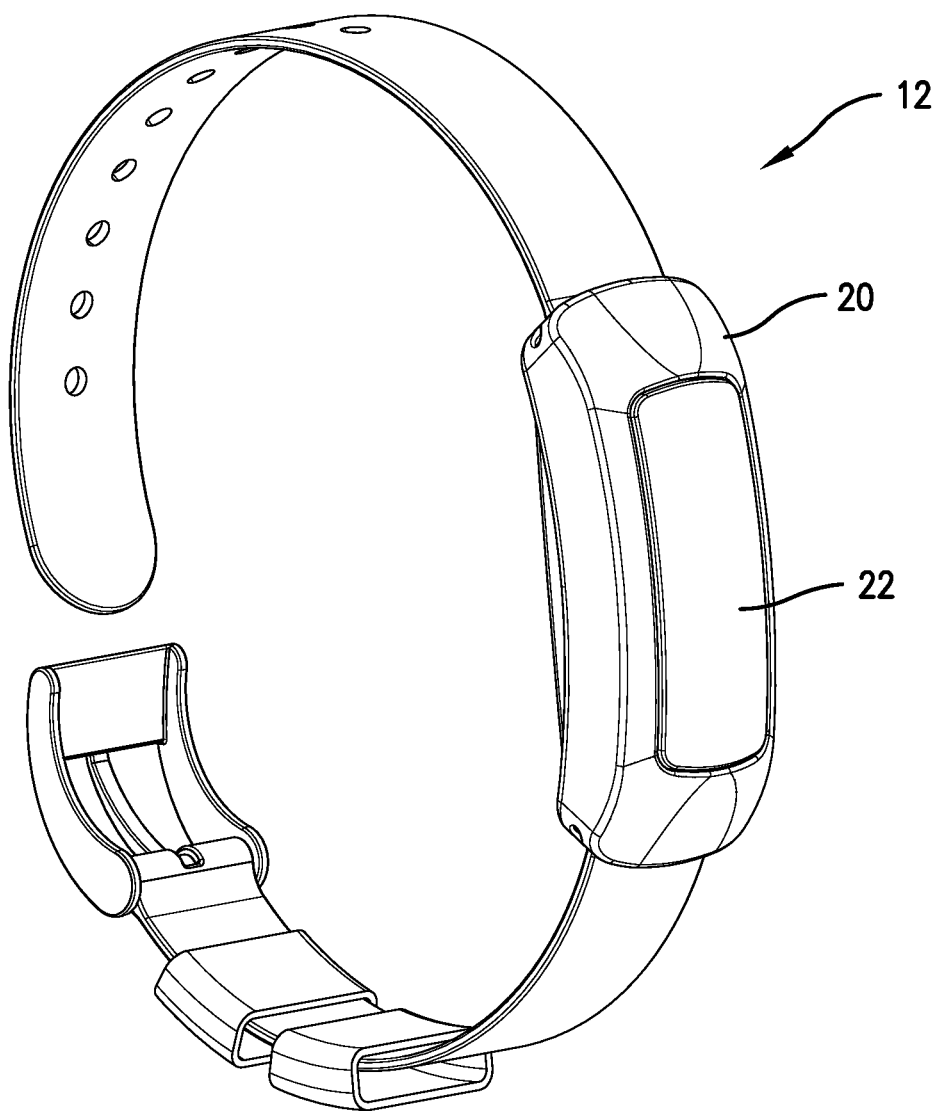
FIG. 2 is a perspective view of an exemplary wearable device according to embodiments of the present invention, with the exemplary wearable device configured to be secured to a user via a band.

The above-described system of embodiments of the present invention will now be described in more detail with reference to the drawings figures. FIG. 1 illustrates an embodiment of a system 10 for collecting and/or analyzing data related to sunlight or other light exposure. The system 10 may broadly comprise a wearable device 12, an external computing device 14, and/or one or more server devices 16, each being in communication over a communication network 18. As previously noted, the wearable device 12 may be in the form of device configured to worn around a user's wrist, such as is illustrated in FIG. 2. Broadly, the wearable device 12 will be configured to capture data related to the amount of sunlight, or other light, to which it is exposed. Based on the data collected by the wearable device 12, the system 10 is configured to monitor a wearer's exposure to sunlight or other potentially harmful light. The wearable device 12 will be described in further detail below.

The external computing device(s) 14 and the server device(s) 16 may include any device, component, or equipment with a processing element and associated memory elements. The processing element may implement operating systems, and may be capable of executing the computer program, which is also generally known as instructions, commands, software code, executables, applications, apps, and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "non-transitory computer-readable storage medium" and may include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, the server devices 16 may further include file stores comprising a plurality of hard disk drives, network attached storage, or a separate storage network.

The external computing device 14 may specifically include mobile communication devices (including wireless devices), work stations, desktop computers, laptop computers, palmtop computers, tablet computers, portable digital assistants (PDA), smart phones, and the like, or combinations thereof. In preferred embodiments, the computing device 14 will have an graphic display, such as a cathode ray tube, liquid crystal display, plasma, or touch screen that is operable to display visual graphics, images, text, etc. In certain embodiments, the computer program of the present invention facilitates interaction and communication through a graphical user interface (GUI) that is displayed via the graphic display. The GUI enables the user to interact with the graphic display by touching or pointing at display areas to provide information to the user interface, which discussed in more detail below. In additional embodiments, the computing device 14 may include an optical device such as a digital camera, video camera, optical scanner, or the like, such that the computing device 14 can capture, store, and transmit digital images and/or videos.

The computing device 14 may include a user interface that enables one or more users to share information and commands with the computing devices 14. In some embodiments, the graphic display discussed above may be included as part of the user interface. The user interface may also comprise one or more functionable inputs such as buttons, keyboard, switches, scrolls wheels, voice recognition elements such as a microphone, pointing devices such as mice, touchpads, tracking balls, styluses. The user interface may also include a speaker for providing audible instructions and feedback. Further, the user interface may comprise wired or wireless data transfer elements, such as a communication component, removable memory, data transceivers, and/or transmitters, to enable the user and/or other computing devices to remotely interface with the computing device 14.

The communications network 18 may be wired or wireless and may include servers, routers, switches, wireless receivers and transmitters, and the like, as well as electrically conductive cables or optical cables. The communications network 18 may also include local, metro, or wide area networks, as well as the Internet, or other cloud networks. Furthermore, the communications network 18 may include cellular or mobile phone networks, short distance wireless networks (e.g., Bluetooth), as well as landline phone networks, public switched telephone networks, fiber optic networks, or the like. Each of the wearable device 12, the computing device 14, and the server device 16 may be connected to the communications network 18. Such connection to the communications network 18 may be wired or wireless. Thus, the wearable device 12, the computing device 14, and the server device 16 may include the appropriate components to establish a wired or a wireless connection.

The computer program of the present invention may run individually on the wearable device 12, on the computing device 14, or on the server device 16. Alternatively, the computer program (or portions thereof) may be run from each of the wearable device 12, the computing device 14, and the server device 16. Thus, a first portion of the program, code, or instructions may execute on the wearable device 12, while a second portion of the program, code, or instructions may execute on the computing device 14. In some embodiments, other portions of the program, code, or instructions may execute on the server device 16 as well. For example, information related to the system 10 may be stored on a memory element associated with the wearable device 12 or server device 16, such that the information is remotely accessible to users of the computer program via the computing devices 14. Regardless, it should be understood that information may be directly stored on the memory element associated with any of the wearable device 12, the computing device 14, and the server device 16. The various functions, features, actions, and/or calculations described herein as being performed by or using the computer program may actually be performed by one or more computers, processors, or other computational devices, such as the wearable device 12, the computing device 14, and/or the server device 16 independently or cooperatively executing portions of the computer program.

As noted above, the computer program (or portions thereof) may be installed on the wearable device 12. In addition, in certain embodiments of the present invention, the computer program (or portions thereof) may be embodied as a program downloaded on the computing device 14 of the user or in a web-accessible program that is accessible by the user's computing device 14 via the communications network 18. For the downloaded computer program, a downloadable version of the computer program may be stored, at least in part, on the server device 16. The user may download at least a portion of the computer program onto the computing device 14 via the network 18. In such embodiments of the present invention, the computer program may be an "application," such as an "app" or a "mobile app" for a mobile device. After the computer program has been downloaded, the program can be installed on the computing device 14 in an executable format. For the web-accessible computer program, the user may simply access the computer program installed on the server device 16 over the network 18 (e.g., the Internet) through the user's computing device 104. As such, the stand-alone computer program or web-accessible computer program provides users with access to the user application from which the users can interact with various embodiments of the present invention. For example, execution of the computer program by the wearable device 12, the computing device 14, and/or the server device 16 can make the user application available so as to permit the user/wearer of the system 10 to perform various of the functionalities and operations described herein.

Turning now to the wearable device 12 in more detail. FIG. 2 illustrates an embodiment of the wearable device 12 worn on the wrist, which may be generally described as a personal monitoring device, activity monitoring device, and/or the like. The wearable device 12 may be a relatively small device so as to be worn continuously by a user. Although the wearable device 12 shown in FIG. 2 can worn on the wrist, the wearable device 12 can include generally any device that can be worn by a subject to monitor exposure to UV radiation, and/or ambient environmental factors such as infrared radiation and ambient light (such as blue light). The wearable device 12 is configured to gather data regarding the ambient environment to which the wearer is exposed, the wearer's interaction with the environment, and/or activities of the wearer, such as real-time and cumulative exposure of the wearer to UV radiation, ambient light exposure levels, pollution exposure levels (e.g., ozone levels) as well as motion/activity of the wearer. The wearable device 12 can transmit the collected data to the external computing device 14 and/or to the server device 16. As such, the computing device 14 and/or to the server device 16 can analyze the data transmitted from the wearable device 12 and display information to be visualized by the wearer or user. As noted previously, the computing device 14 can include various computing devices, such as mobile/handheld computing devices, smart devices, health stations, and the like, which include a memory for storing the data and the computer program, as well as a processor for running the computer program and analyzing the data sent by the wearable device 12. In some embodiments, the user will be able to create a personalized user account to be associated with the computer program and/or the user application, which the user can access the user application and perform various of the functionalities and operations described herein.

The wearable device 12 and external computing device 14 may include suitable hardware, software, and/or firmware for sending and communicating data. The wearable device 12 and/or external computing device 14 may also include means for alerting the user or wearer if certain conditions are met by the data. The wearable device 12 collects and transmits the collected data; however, measurement and calculations relative to the data or associated metrics may, in some embodiments, only be carried out on the external computing device 14. In other words, in preferred embodiments, the wearable device 12 itself does not process, calculate and/or visualize the data or associated metrics for the user. In other words, in preferred embodiments, the wearable device 12 itself does not include necessary hardware, software, and/or firmware for implementing certain of the functionality (e.g., analyzing of data) that is generally left to be performed by the external computing device 14.

Figure 3:
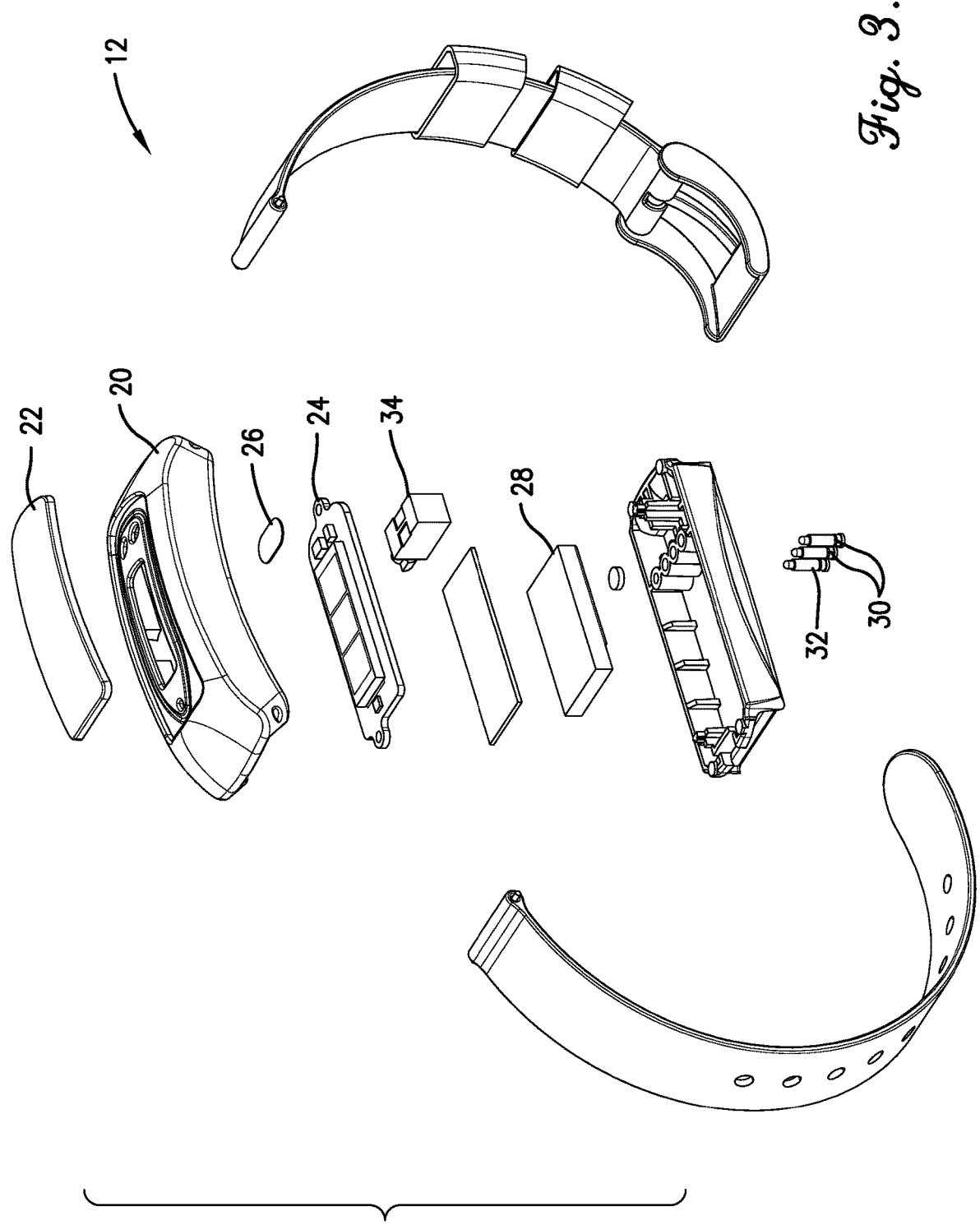
FIG. 3 is an exploded view of the exemplary wearable device from FIG. 2.
Figure 4:
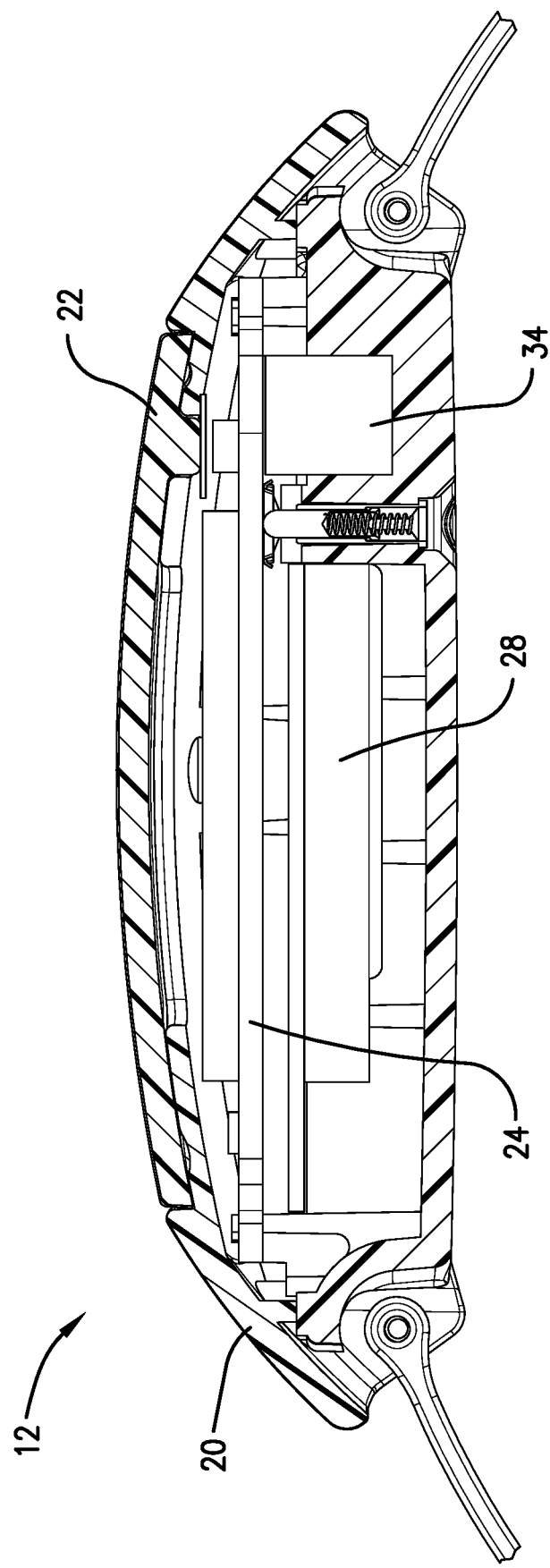
FIG. 4 is a cross-sectional side view of the exemplary wearable device from FIGS. 2 and 3.

As shown in FIGS. 2-4, the exemplary wearable device 12 is shown comprising a housing 20 that is configured to contain various components of the wearable device 12. The housing 20 can be of any suitable material, including plastic, aluminum, composite, and combinations thereof. The housing 20 includes a bottom plate, configured to face adjacent the wearer, and a top enclosure configured to face away from the wearer (and towards the ambient environment). The top enclosure of the housing defines an opening or window configured to receive a lens 22 for receiving and allowing to pass therethrough UV radiation, ambient light, and infrared radiation. The lens 22 is preferably made of plastic with high UV radiation transmission values, and preferably has a UVA transmittance of greater than about 80%, more preferably greater than about 90%, and even more preferably greater than or equal to about 94%, and a UVB transmittance of greater than about 80%, more preferably greater than about 90%, and even more preferably greater than or equal to about 94%. In one or more embodiments, the lens 22 shape is configured to funnel UV radiation and light received by the lens toward one or more light sensors (discussed below).

Figure 5:
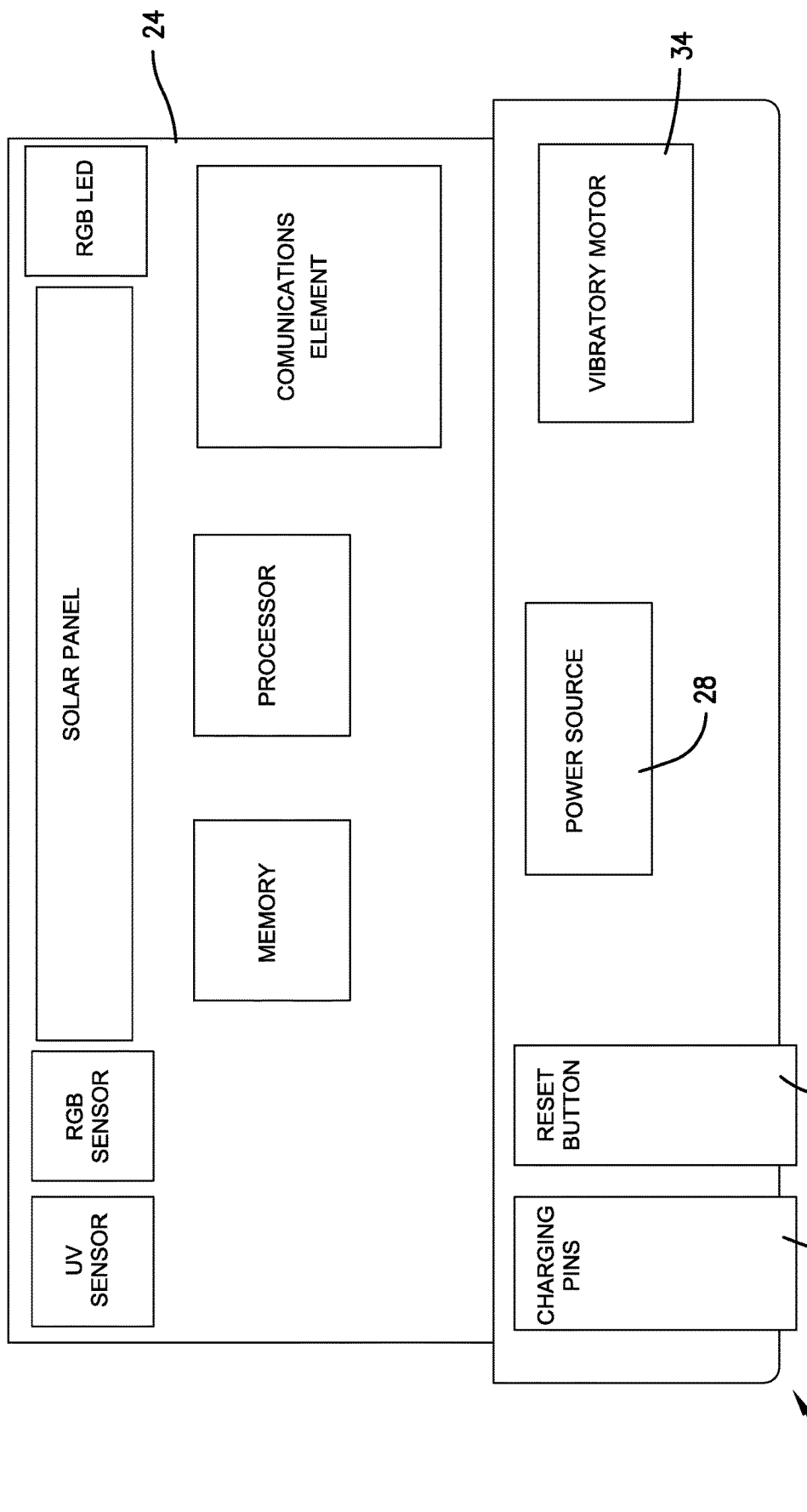
FIG. 5 is a schematic representation of certain components, such as a control element, of the exemplary wearable device from FIGS. 2-4.

With reference to FIGS. 3 and 4, the wearable device 12 may include an electronic control element 24 for obtaining and transmitting data, such as data related to light exposure and/or movement (e.g., steps) of the wearer. In some embodiments, the control element 24 may also be configured to store and analyze/process certain types of data. As shown in the drawing figures, the control element 24 may be positioned underneath the lens 22 so as to be exposed to light that passes through the lens 22. A schematic diagram of certain portions of the control element 24 is illustrated in FIG. 5. In some embodiments, the control element 24 may comprise a microcontroller with one or more processing elements, one or more memory elements, and/or one or more transmitters, receivers, or transceivers. The processing elements and/or memory elements of the wearable device 12 may be similar to those elements described above with respect to the external computing device 14. In other embodiments, the control element 24 may more broadly comprise one or more integrated circuits and/or a printed circuit board assembly (PCBA), In addition, the control element 24 may include one or more sensors for receiving light transmitted via the lens 22. In one or more embodiments the control element 24 includes one or more light sensors. Preferably, the control element 24 includes a UV sensor for detecting UVA and/or UVB radiation to which the wearer is exposed. Preferably, the control element 24 further includes one or more red-blue-green ("RGB") color sensors for detecting ambient light intensities to which the wearer may be exposed. Preferably, the control element 24 further includes one or more infrared sensors for detecting infrared radiation intensities to which the wearer may be exposed. The control element 24 may also be associated with a diffuser element 26 for diffuses (or spreads) the incoming light into component wavelengths for measurement of the one or more light sensors. In some embodiments, the wearable device 12 may also include one or more sensors configured to measure air-pollution (e.g., ozone), or other air-quality metrics, from the ambient environment.

In one or more embodiments, the control element 24 further comprises a communication element for wireless communication (e.g., via the communications network 18), so as to transfer data between the wearable device 12 and the external computing device 14. Such wireless communication may be over Bluetooth (e.g., Bluetooth Low Energy protocols), WiFi, 3G, 4G, cellular, RFID, NFC, or WLAN. Advantageously, the control element 24 may further comprises a solar panel (e.g., approximately 1 Watt or less) connected to an electronic power source 28 (e.g., a rechargeable battery external to the control element 24), so as to provide for the wearable device 12 to be charged and powered via solar power.

The power source 28 may provide electrical power to each of the components of the wearable device 12. As illustrated, the power source 28 may be situated in the wearable device 12 housing 20, preferably underneath the control element 24, along with charging pins 30 and a reset button 32. The wearable device 12 may further includes a component for generating an alert for the wearer, such as a vibratory motor 34, or electronic audible alert mechanism. In some embodiments, the wearable device 12 may include a light-emitting diode ("LED"), such as an RGB LED. The LED may be included, in some embodiments, as part of the control element 24. The LED may be used to indicate "on" and collecting data, battery states, error states, pairing status (e.g., green for paired, and blue for not paired) and exposure notifications.

As noted, the wearable device 12 can connect via the communications network 18, which may include Bluetooth, to the external computing device 14, such as a smart phone, tablet, and/or smart watch. In some embodiments, the wearable device 12 may be configured to sense contact by the wearer (e.g., via the accelerometer) to receive instructions from the wearer. For example, a "double tap" (i.e., two quick, consecutive touches by the wearer) on the wearable device 12 may instruct the wearable device 12 to provide feedback as the connection state of the wearable device 12 with the external computing device 14. A green light, such as may be emitted by the RGB LED may indicate that the wearable device 12 is paired with the computing device 14, whereas a blue light may indicate that the wearable device 12 is not paired with the computing device 14. Furthermore, in some embodiments, the wearable device 12 (and/or the computing device 14) may provide an alert (e.g., vibration, RGB LED, etc.) to the user when the wearable device 12 becomes un-paired with the external computing device 14.

It will be appreciated that the wearable device 12 can further include one or more various other sensors, such as an accelerometer obtaining activity information and/or for tracking movement (e.g., steps) of the wearer, GPS location, etc., or other physiological metrics of the wearer (e.g., heart rate, etc.), without departing from the spirit of this invention.

The wearable device 12 can be secured to the wearer such as through a band, as depicted in FIGS. 2 and 3; however, it will be appreciated that alternative techniques can be used, including a clip, strap, lanyard, etc.

Preferably, the wearable device 12 is secured to the wearer such that the lens 22 is directed away from the wearer's body to maximize exposure of the sensors in the wearable device 12 to the ambient environment. In one or more embodiments, the wearable device 12 may be secured to the wearer's clothing or gear (e.g., shirt, hat, stroller, backpack, etc.), instead of being secured directly to the wearer's person.

As noted above, in use, the wearable device 12 (and more specifically the sensors therein) collects data and transmits the raw data to the external computing device 14 for measuring, calculating, and analyzing the data to generate output values for the user. In one or more embodiments, the wearable device 12 itself does not include a visual display. In general, the output values are displayed for the user on the external computing device 14 (e.g., smart phone). The external computing device 14 may transmit a signal to the wearable device 12 to generate an alert as previously described; however, in most embodiments, specific metrics and output values related to the data obtained by the wearable device 12 are displayed on the external computing device 14, and not on the wearable device itself 12. Nevertheless, it should be appreciated that in some embodiments, the wearable device 12 may include a graphic display for displaying information to the wearer.

In some embodiments, the computing device 14 is in remote communication with the wearable device 12, and operable to receive data transmitted by the wearable device 12. Exemplary external computing devices 14 include personal computers, health work stations, handheld computers, smart devices (e.g., smart phone, smart watches), and the like. The external computing device 14 may, as previously described, include a user interface to enable the user to interact with the system. This may include connecting and configuring the device and associated user application, including any settings or user profile information (e.g., wearer characteristics) required or prompted by the user application, such as creating and setting up an account to be associated with a particular wearable device 12 and user. The user interface may, as previously described, include a graphic display, which may be a touchscreen display and/or may further be accommodated with a keyboard, mouse, etc. The external computing device 14 may, as previously described, include a memory and a processor to implement the methods described herein for determining a wearer's sun exposure risk and other metrics. The processor executes machine readable instructions (i.e., computer programs, codes, or the like) according to a light-exposure algorithm described herein that cause the processor to process the data transmitted by the wearable device 12 (e.g., measure and calculate various metrics related to UV and ambient light exposure). The data may be stored on the external device 14 and/or further transmitted or stored on the remote server device 16 and/or in the "cloud." The data stored on the server device 16 and/or in the "cloud" may be monitored remotely and alerts may be sent to the wearer (e.g., via the wearable device 12 or via the computing device 14) to indicate "high-risk" behavior. Exemplary data that may be stored on the server device 16 includes: user profile information (name, gender, age, skin type, etc.), raw UV data, raw infrared data, and raw visible light data, calculated UV, calculated infrared, and calculated visible light data, user location data, sunscreen application data, sun protection behaviors such as the usage of sun-protective clothing, oral sun-protection and topical antioxidants, the wearer's daily MED percentage, and motion data, such as a pedometer.

Data from the sensors on the wearable device 12 may be transmitted to the external computing device 14 at substantially uniform intervals, to intermittently update the data analyzed by the computing device 14 (e.g., via the light-exposure algorithm and other data processing embodiments described herein). In one or more embodiments, the data is collected and transmitted at least every 5 minutes, preferably at least every 3 minutes, preferably at least every 60 seconds, preferably at least every 45 seconds, preferably at least every 30 seconds, preferably at least every 15 seconds, and more preferably at least every 5 seconds. Advantageously, such collections allows the external computing device 14 to measure, monitor, and display a "real time" or instantaneous UV index (UVI) value for the user (as compared to a static forecast). Although it is preferable that the wearable device 12 automatically collects and transmits the data, manual data collection where the wearer or user prompts the wearable device 12 to collect the UV exposure data is also contemplated. It is also envisioned that data could be collected and transmitted continuously. In general, the preferred approach can be balanced by the wearable device 12 or the user to reduce power consumption and/or to otherwise maximize power availability to the wearable device 12.

Figure 6:
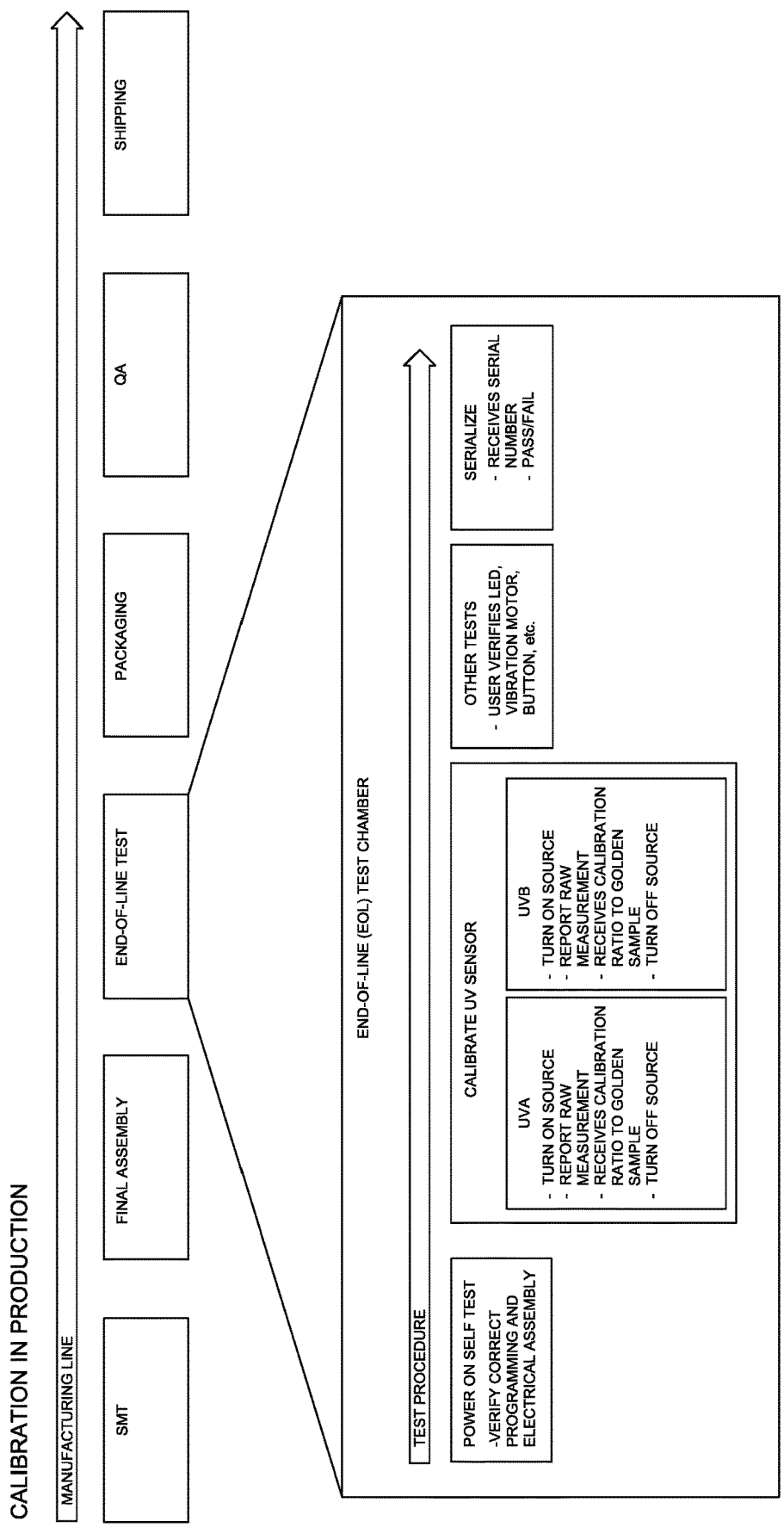
FIG. 6 is an exemplary manufacturing process flow for a wearable device, with the manufacturing process including a calibration process according to embodiments of the present invention.

To enhance accuracy of the wearable device 12, each wearable device 12 is preferably subjected to a calibration process in comparison to a known calibrated sample (herein referred to as the "golden sample"). This is because the inventor has determined that accurate UV measurement vary depending upon the housing 20 enclosure, lens 22 material, and manufacturing and assembly processes. A flow chart of an exemplary production process for a wearable device 12, which includes a calibration process, is illustrated in FIG. 6. The calibration process advantageously ensures that the collected data accounts for variations in the housing 20 enclosure and lens 22 material. In one or more embodiments, each wearable device 12 is preferably subjected to the calibration process and device specific calibration coefficients are determined. A "golden sample" is created through testing with a calibrated light source and calibrated radiometer. For example, upon manufacturing a wearable device 12, the wearable device 12 will undergo a calibration process whereby calibration coefficients are determined for each of UVA and UVB. Specifically, a UVA source with known output may be turned on, such that the light sensors in the wearable device 12 can measure the UVA light emitted by the UVA source. The UVA light measured by the wearable device 12 can be compared with expected values from the known UVA source so as to obtain a UVA calibration coefficient for the wearable device. A similar process can be performed for UVB light. Specifically, a UVB source with known output may be turned on, such that the light sensors in the wearable device 12 can measure the UVB light emitted by the UVB source. The UVB light measured by the wearable device 12 can be compared with expected values from the known UVB source so as to obtain a UVB calibration coefficient for the wearable device.

Figure 7:
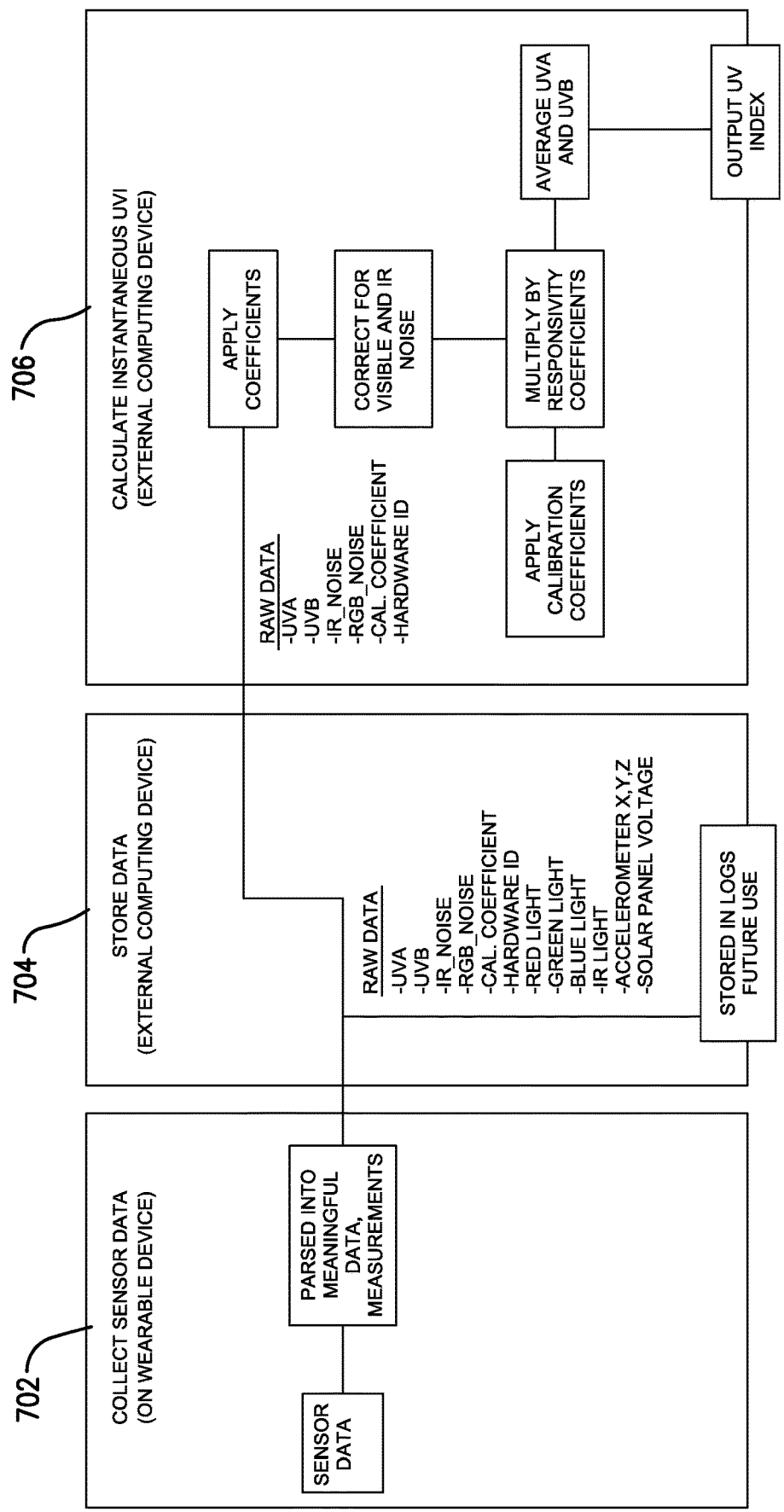
FIG. 7 is a process flow depicting collection of data from sensors of a wearable device according to embodiments of the present invention, and calculation of UV index values using a method of embodiments of the present invention.

FIG. 7 is a flow chart illustrating a method for establishing and managing communication between the wearable device 12 and the external computing device 14. At Step 702, the wearable device 12 collects data on the UV spectrum the wearer is exposed to at two points or wavelengths (i.e., UVA and UVB). At Step 704, the wearable device 12 transmits the raw data to the external computing device 14 for storage and analysis. As illustrated in Step 706, the computing device 14 (e.g., via its processor) executes code according to the light-exposure algorithm to filter noise from visible and infrared light to which the wearer is exposed. The light-exposure algorithm is then used to calculate the real time UVI, preferably within an accuracy of +/−1 UVI.

The process illustrated in FIG. 7 will now be described in more detail. In one or more embodiments, the sensors on the wearable device 12 collect raw data which is then transmitted to the external computing device 14. The external computing device 14 parses the raw data received and transforms it into meaningful measurements. The external computing device 14 may, as previously described, include memory for storing the data from the wearable device 12. In one or more embodiments, data is not stored on the wearable device 12 itself, but only on the external computing device 14. Exemplary data that may be collected by the wearable device 12 sensors includes: UVA, UVB, infrared noise, ambient light (RGB) noise, calibration coefficients unique to a specific wearable device, the hardware ID number, red light, green light, blue light, infrared light, motion data (accelerometer x, y, z), and/or solar panel voltage. In order to calculate the real time UVI, the raw UV data from the wearable device 12 is processed on the external computing device 14 as follows. Based upon the wearable device's 12 hardware ID, responsivity and noise correction coefficients (correction coefficients) are applied to the raw UV data (including UVA, UVB, and noise) transmitted from the wearable device 12, and the output value is corrected for visible and infrared noise values. Calibration coefficients, based on the "golden sample" and created and stored on the wearable device 12 during manufacturing, are then applied to this value. The data is further transformed though the application of responsivity coefficients, generating a corrected, calibrated UVA and UVB value. The resulting UVA and UVB values are averaged, arriving at an output UVI value. In one or more embodiments, this real-time UVI value is displayed on the user interface of the external computing device 14.

The output UVI value can also be subjected to a series of filtering and adjustments to ensure that the output information displayed on the user interface of the computing device 14 reflects real-world exposure values. Different filtering and adjustments are applied to the data, depending upon the output information being displayed on the user interface of the computing device 14. In one or more embodiments, the user interface may display more than one type of output value in addition to the real time UVI value noted above. For example, the output information displayed on the user interface of the computing device 14 may include values for the accumulated exposure time (e.g., in minutes or seconds) of the wearer to low UV levels (<2), moderate UV levels (3-5), high UV intensity levels (6-7), very high UV intensity levels (8-10), and extreme UV intensity levels (11+). The output information displayed on the user interface of the computing device 14 may also include values for the UVI over time, for example, in the form of an activity chart which plots UV exposure intensities over the course of a given day. The output information displayed on the user interface of the computing device 14 may also include motion data or other activity information, such as obtained from a pedometer or accelerometer. For instance, the number of "steps" taken by the wearer in a given time period may be plotted on the same graph in relation to the UV exposure over the course of the day.

Output information displayed on the user interface of the computing device 14 may also include a visual indication of the calculated amount of exposure of the wearer to UV radiation as a percentage of the wearer's total calculated minimal erythema dose ("MED"). MED is generally understood in the art to denote the amount of UV radiation that will produce minimal erythema (sunburn or redness caused by engorgement of capillaries) of an individual's skin shortly after exposure. MED varies from person to person based upon their skin type (e.g., types I, II, III, IV, V, and VI, Fitzpatrick, 1988). One MED is the approximate dose in $J/m^2$ required to obtain reddening of the skin. For example, fair skin (type I) that never tans and always burns is generally considered to have an MED of 200. In contrast, darker skin (type IV) that always tans and never burns is generally considered to have an MED of 450. It will be appreciated that these values, which are generally accepted in the art are based upon a static/steady state equation that does not take into account a number of real world factors, including sunscreen use (or lack thereof), activity information or levels, relative UV intensities in various regions, and the like. Thus, embodiments of the present invention are concerned with measuring and determining the wearer's real-world MED, and specifically the percentage of the wearer's MED (% MED) at a given time during the day to prevent sunburn and/or premature aging due to UV exposure. In one or more embodiments, the output information is displayed as a visual representation of the wearer's % MED at a given time point, such as in a circle graph. Essentially, the information displayed indicates how close the wearer is to achieving 100% of their MED (and therefore a possible sunburn) for the day. It should be understood that, for some individuals, a wearer may require 300% MED before the wearer shows any physical signs of sun damage (e.g., a sunburn). As such, the present invention can provide preventative information to the wearer before physical symptoms appear. In one or more embodiments, the output information may indicate the wearer's MED or % MED as a value relative to the wearer's photoaging risk factor for developing wrinkles and other signs of premature aging due to UV exposure. In one or more embodiments, additional methods may be used to assess skin type reaction to UV or light exposure. Such additional methods may include immediate pigment darkening, persistent pigment darkening, and/or immune protection factors. Thus, these additional methods may be used to track the effects of the sun (i.e., from exposure to UV light, ambient light, and/or infrared light).

Figure 8:
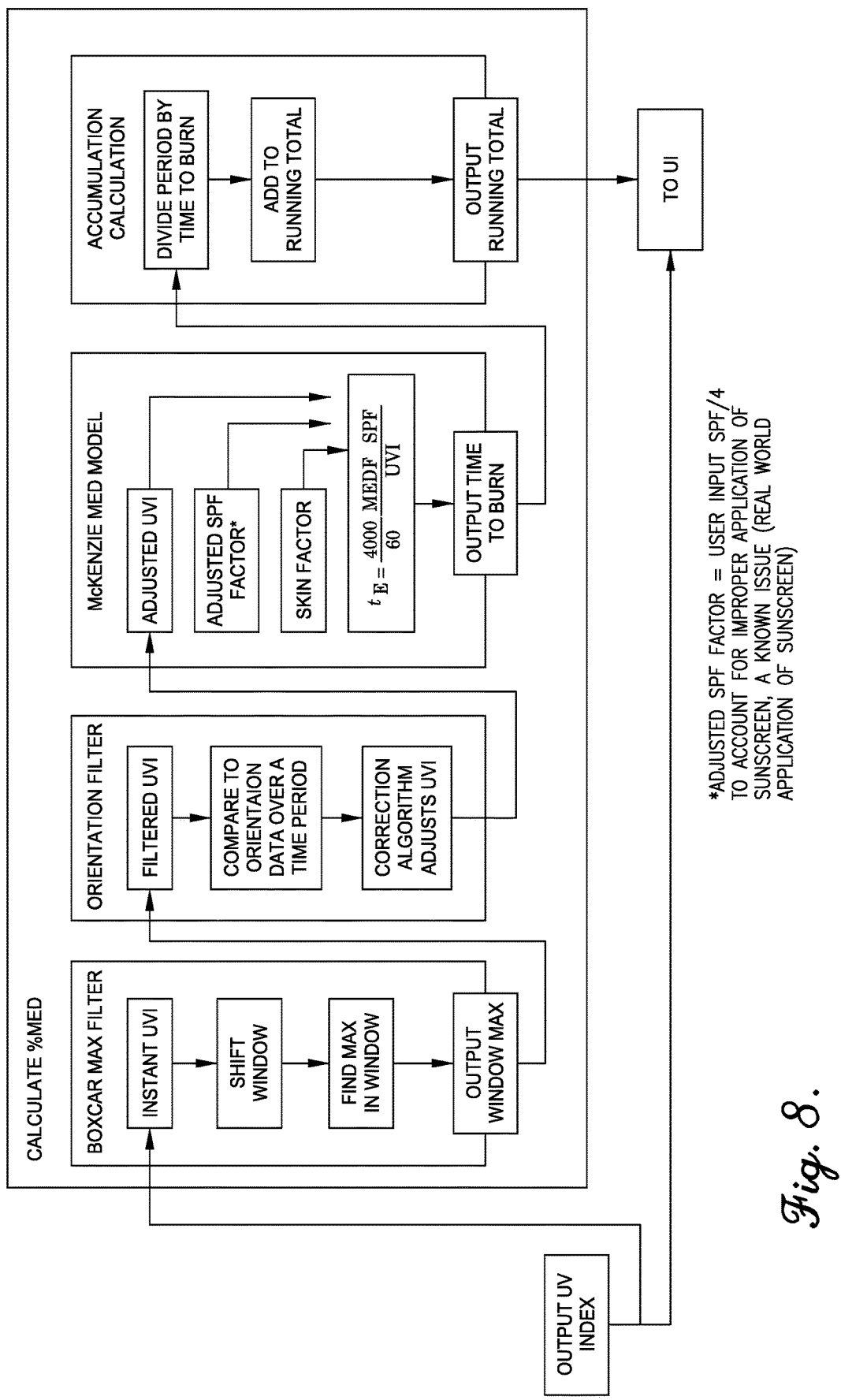
FIG. 8 is a process flow depicting calculation of percentage of minimal erythema dose (MED) using filtered or adjusted values of the data collected in FIG. 7, according to embodiments of the present invention.

With reference to FIG. 8, in order to arrive at the % MED, the system applies a series of filters and adjustments to the data and user inputs fed into the light-exposure algorithm. In one or more embodiments, the output UVI value is filtered upfront using a boxcar-type filtering process (i.e., Boxcar Max Filter of FIG. 8). This approach assumes that the wearable device 12 may not always be positioned such as to capture the peak exposure of the wearer to UV radiation. For example, the wearable device 12 may be obstructed by a sleeve, or structure of some kind, whereas the wearer's body is still otherwise being exposed to UV radiation, even though not detected by the UV sensors in the wearable device. Thus, the output UVI value (which is regularly updated as discussed above and referred to in FIG. 7 as the "instant UVI") is measured over a given period of time, and the max value (peak exposure) during that given period of time is selected as the filtered value for further processing. In one or more embodiments, the period of time can range from about 30 seconds to about 5 minutes, or any selected interval therebetween. For example, output UVI values are measured for a 5-minute period of time, and the peak exposure value during that 5-minute window is selected as the UVI value that is plugged into subsequent calculations. The resulting "Filtered UVI" can be further adjusted.

Figure 9:
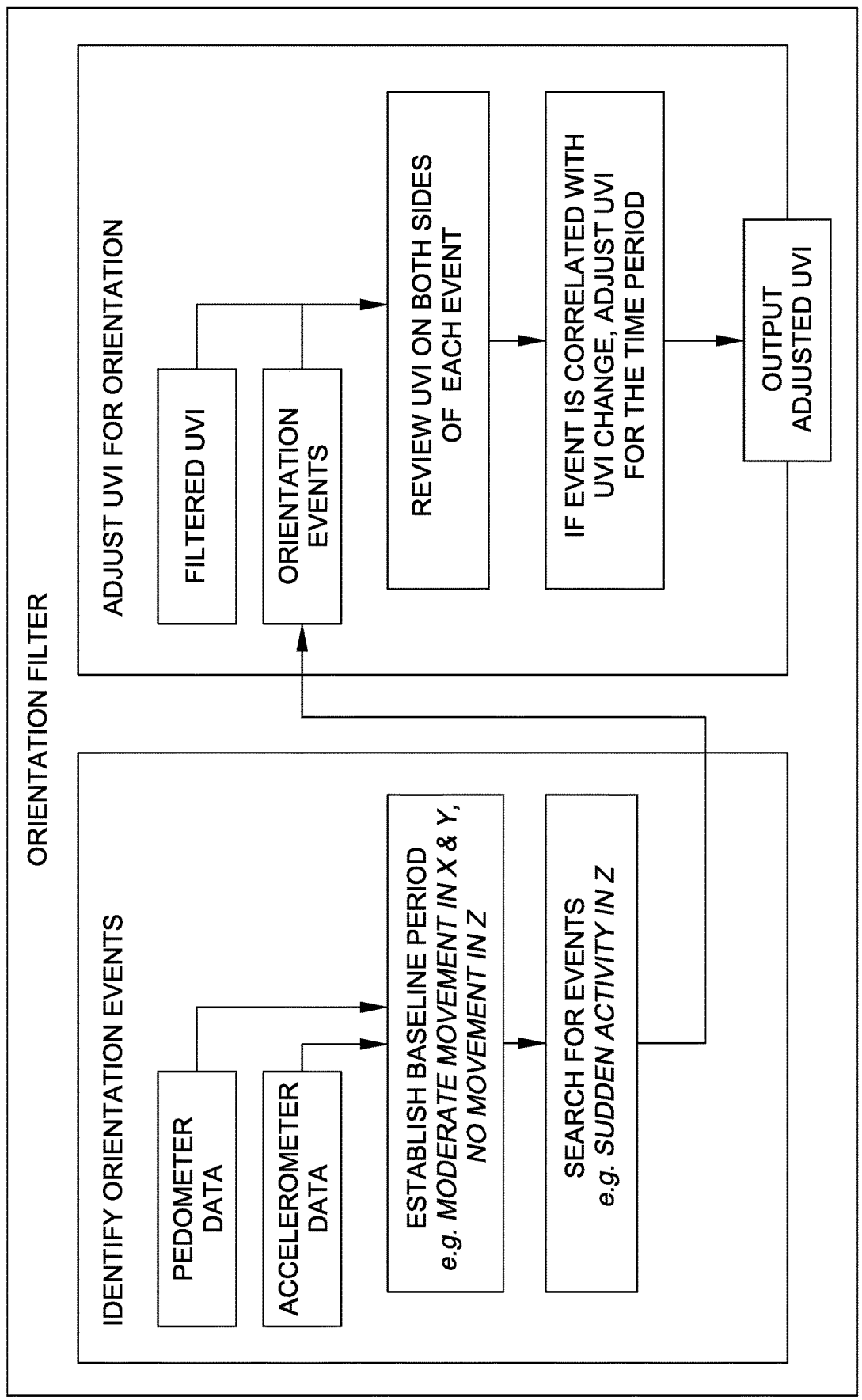
FIG. 9 is a process flow depicting orientation adjustment filtering of the data collected in FIG. 7, according to embodiments of the present invention.

In one or more embodiments, as depicted in FIG. 8 (i.e., Orientation Filter) and further in FIG. 9, the Filtered UVI value may also be adjusted to account for positioning and/or orientation of the wearable device 12 in situations where a position or orientation of the wearable device 12 is suboptimal for collecting the actual UV radiation to which the wearer is being exposed. For example, the wearer's wrist may be turned away from the sun. Such position and/or orientation of the wearable device 12 may be determined by an accelerometer and/or pedometer. For instance, an accelerometer can be used to detect the orientation of the wearable device 12 relative to the sun for a given period of time, and the detected UVI value can be adjusted accordingly. In more detail, a baseline orientation over a baseline period may be established. Such baseline orientation may consider the user's average movement over the baseline period the X or Y directions. The filtering process may then search for sudden position or orientation changes in the X, Y, and/or Z directions to determine if any orientation events have occurred. If an orientation event has been determined to have occurred, then the filter process may analyze the UVI values immediately before and after the orientation event to determine if the orientation event is correlated with a UVI change. In such instances, the output UVI may be adjusted for the baseline period.

Likewise, this additional filtering can be used to confirm that the boxcar filtering process discussed above is based upon a valid data set for that given period of time (e.g., the baseline period). Alternatively, the filtering process may ascertain if a given data set should be thrown out. As such, this approach prevents the wearable device 12 from giving an erroneous output, if the wearer is indeed being exposed to UV radiation, but the wearable device 12 is obstructed or positioned incorrectly to capture the UV radiation data.

As illustrated in FIG. 8 (i.e., the McKenzie MED Model) The resulting "Adjusted UVI" value may then used to calculate the wearer's % MED. In one or more embodiments, the % MED is calculated using a modified version of the McKenzie model:

$$t_E = \frac{4000}{60} \frac{MEDF \cdot SPF}{UVI}$$

where MEDF is the wearer's skin type factor value, which is determined based upon the table below, SPF is the wearer's Adjusted SPF factor for any sunscreen that the wearer has applied, and UVI is the Adjusted UVI discussed above. In some additional embodiments, the Adjusted SPF, or the % MED value more broadly, may be further based any sun protective (UPF) clothing the wearer may be wearing.

TABLE 1

McKenzie Skin Type Factor

| Fitzpatrick Skin Type/Score | MEDF |
|---|---|
| 1 | 2 |
| 2 | 2.5 |
| 3 | 4 |
| 4 | 5 |
| 5 | 6 |
| 6 | 6 |

Advantageously, as illustrated in FIG. 8 (i.e., the Accumulation Calculation), the output information on the user interface is not a static "time to burn," but will change over time based upon the activity and exposure of the wearer. The accumulated exposure will be measured and monitored and the output running total of % MED will be updated on the user interface display accordingly. In particular, the McKenzie formula is a discrete point-in-time calculation; however, the user needs cumulative exposure outputs. Thus, in the inventive method, the percentage of 1 MED reached for a discrete time period is calculated to achieve a % MED value, each time the UVI output value is updated (e.g., every 15 seconds), and a cumulative running total of each calculated % MED is processed by the external computing device and presented on the display. In this way, the user interface of the computing device 14 can display a real time % MED that is updated regularly so that the user is informed about sun exposure risk levels. An exemplary data set is shown in FIG. 10 for a two-hour collection time period for sun exposure. Certain of such data and/or graphs of FIG. 10 may be presented to the user via the user interface of the computing device 14.

Based on such data, as analyzed by the computing device 14, embodiments of the present invention can generate alerts for the wearer when it is time to reapply sunscreen. The alerts may be provided on the computing device 14 or on the wearable device 12. For example, the system 10 may include a stand-alone sunscreen reminder device generating an alert after a specified period of time has elapsed (e.g., threshold of about 2 hours) after the wearer/user logs application of sunscreen. The system 10 may also include an alert based upon an increase in % MED (discussed below) after a set period of time has elapsed (i.e., if total exposure is greater than X % and 2 hours have passed, then generate sunscreen re-application alert). Thus, the wearable device 12 may generate an alert (e.g., upon receiving an indication from the computing device 14) for the wearer to re-apply sunscreen when the wearer's total calculated minimal erythema dose increases by a particular threshold and/or after a particular amount of time (set in the system) has passed. The system 10 may also generate an alert if the wearer reaches a threshold % MED in relation to a calculated MED value that increases the wearer's risk factor for photoaging. Alerts can be predetermined by the system 10, or can be self-selected by the user or wearer based upon inputs of selected thresholds related to MED, exposure levels, skin damage levels, etc. These alerts may supersede a timed alert; the system 10 may also learn these times and automatically generate alerts according to user/wearer preferences.

As noted, the external computing device 14 and/or the wearable device 12 can generate alerts if the wearer is nearing 100% MED (or some other threshold value that may be set by the user). This would also alert the user (or wearer) that sunscreen should be applied or reapplied. As noted above, the time to burn includes an Adjusted SPF value.

When the wearer has applied sunscreen, this information can be entered into the external computing device 14, including the SPF of the sunscreen used. In some embodiments, specific details about the sunscreen may be included, including specific brands. It is envisioned that the external computing device 14 may include a QR reader or bar code scanner to automatically input the sunscreen information. Regardless, instead of using the actual sun protection factor value as indicated for the sunscreen applied by the wearer, the inventive method may use an Adjusted SPF value that is only a fraction (aka percentage) of the indicated SPF for the sunscreen in calculating the time to burn. In one or more embodiments, the Adjusted SPF value may be about 25% of the indicated SPF value for the sunscreen; however, other values can be used include any integer from 10% to about 95% (preferably from about 15% to 90%) of the indicated SPF for the sunscreen. For example, if the wearer applies an SPF 30 sunscreen, the user enters a sun protection factor value of 30 into the external computing device 14. However, in calculating the wearer's % MED, the computing device 14 uses a value of 7.5 for the Adjusted SPF in the equation above (i.e., 25% of 30). If the wearer does not apply sunscreen, an Adjusted SPF value of 1 is used. In addition, if the wearer is alerted to reapply sunscreen, but either does not re-apply sunscreen, or does not update the application and enter the sunscreen value, an Adjusted SPF value of 1 will be used in the calculation of % MED for subsequent calculations. Such Adjusted SPF values may be beneficial, for example, in instances where a user does not re-apply sunscreen or improperly applies sunscreen. In situations where a user wears UPF clothing, such Adjusted SPF values may not require modification (as was described above with SPF sunscreen), because UPF clothing can provide specific, consistent amounts of protection from UV and other light. Specifically, in such embodiments, in calculating the wearers % MED, the computing device 14 would use a value of 100% of the SPF Value indicated by the UPF clothing.

As noted above, the user can provide an indication into the computing device 14 as to point in time when SPF sunscreen was reapplied. In some additional embodiments, the user may be able to provide such an indication directly into the wearable device. For instance, the wearer may be able to "triple tap" (i.e., three quick, consecutive touches by the wearer) the wearable device 12, which would instruct the wearable device 12 to transmit information to the computing device 14 that SPF sunscreen was re-applied by the wearer. In some embodiments, the computing device 14 would log, based on the transmitted information, that the wearer re-applied the same type and the same amount of SPF sunscreen as was previously applied and logged by the wearer. Upon performing the "triple tap," the wearable device 12 may provide an indication back to the wearer (e.g., a green light via the RGB LED and/or a vibration via the vibratory device 34) that the information was successfully transmitted to and/or logged by the computing device 14.

In one or more embodiments, the wearable device 12 may further comprise a sensor for detecting if the UV/light sensor of the device is being obstructed, such as by a sleeve, and this information can be applied to the filtering process described above to ensure that erroneous reading do not adversely affect the data outputs and alerts. Such a sensor may be another light sensor positioned separately from the primary light sensors. This feature may also generate an alert (e.g., via the wearable device 12 or the computing device 14) to inform the wearer that the sensor is obstructed.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

References are made herein to the "wearer" and the "user." The "wearer" refers to the subject that is wearing the wearable device. The "user" refers to the individual using the external computing device at a given time, including entering information according to user prompts, or viewing output information displayed on the external computing device. In some cases, the wearer and the user may be the same person. In other cases, the wearer may be a patient, child, pet, etc., and the user may be a different individual, such as a clinician, healthcare provider, data analyst, care giver, parent, grandparent, babysitter, teacher, and the like who is remotely monitoring the sun exposure of the wearer.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

The invention claimed is:

1. A system for monitoring ultraviolet (UV) exposure of a wearer, comprising:
   a wearable device operable to sense UV radiation levels to which the wearer is exposed, and transmit UV radiation information;
   an external computing device in remote communication with the wearable device, operable to receive the UV radiation information from the wearable device and configured to determine the wearer's real-time UV index value and the wearer's daily cumulative percentage of minimal erythema dose based upon the UV radiation information,
   wherein the external computing device comprises a processor configured to execute machine readable instructions that cause the processor to:
      store, in a memory, the UV radiation information transmitted from the wearable device;
      apply a device-specific calibration coefficient to the UV radiation information;
      correct for visible and infrared radiation noise in the UV radiation information; and
      average UVA and UVB levels in the UV radiation information to generate an output for the wearer's real-time UV index value.

2. The system of claim 1, wherein said external computing device comprises said memory, which is configured to store said UV radiation information transmitted from said wearable device.

3. The system of claim 1, wherein said memory is configured to store one or more wearer characteristics.

4. The system of claim 3, wherein said one or more wearer characteristics include the wearer's Fitzpatrick skin type.

5. The system of claim 3, wherein said one or more wearer characteristics include a sun protection factor (SPF) value for sunscreen applied by the wearer.

6. The system of claim 5, wherein the percentage of minimal erythema dose is based upon an Adjusted SPF value that is a percentage of the actual SPF value for the sunscreen applied by the wearer.

7. The system of claim 6, wherein the Adjusted SPF value is about 25% of the actual SPF value for the sunscreen.

8. The system of claim 1, wherein the percentage of minimal erythema dose is based upon an Adjusted UV index value based upon orientation of the wearable device relative to the sun.

9. The system of claim 1, wherein said real-time UV index value is displayed for a user on the external computing device.

10. The system of claim 9, wherein said external computing device is further configured to receive the UV radiation information at regular intervals, thereby updating the real-time UV index value displayed for the user according to said intervals.

11. The system of claim 10, wherein said external computing device is further configured to display the UV index value on the external computing device to visually indicate the UV index value over time.

12. The system of claim 11, said wearable device further comprising an accelerometer operable to sense motion of the wearer, and transmit activity information to said external computing device, said external computing device is further configured to display the UV index value over time in relation to the activity of the wearer over time.

13. The system of claim 1, said processor further configured to calculate the amount of exposure of the wearer to UV radiation as a percentage of the wearer's total calculated minimal erythema dose over time, based upon the wearer's skin type and sunscreen protection factor application.

14. The system of claim 13, wherein said wearable device and/or said external computing device are operable to generate an alert for the wearer to re-apply sunscreen when the percentage of the wearer's total calculated minimal erythema dose reaches a threshold value, or the time since last sunscreen application has reached a threshold value.

15. The system of claim 1, wherein
said wearable device is further operable to sense ambient light levels to which the wearer is exposed, and transmit ambient light information; and
said external computing device in remote communication with the wearable device, is further operable to receive the ambient light information from the wearable device and configured to determine the wearer's ambient light exposure and the wearer's daily cumulative ambient light exposure level based upon the ambient light information.

16. The system of claim 15, said wearable device comprising an IR sensor to yield IR radiation information of said wearer.

17. A method of monitoring ultraviolet ("UV") exposure of a wearer, comprising:
detecting UV radiation levels to which the wearer is exposed via a wearable device worn by the wearer, said wearable device comprising a UV sensor to yield UV radiation information;
transmitting the UV radiation information to an external computing device;
receiving through a user interface the wearer's skin type and sunscreen protection factor information for the wearer; and
presenting on a display of the external computing device the wearer's real-time UV index value and the wearer's daily cumulative percentage of minimal erythema dose based upon the UV radiation information, skin type, and sunscreen protection factor information,
wherein said real-time UV index value is determined by filtering noise for visible and infrared light from said UV radiation information, and averaging UVA and UVB values from said filtered data to yield said real-time UV index value.

18. The method of claim 17, wherein said real-time UV index value is calibrated specifically for said wearable device.

19. The method of claim 17, further comprising monitoring infrared (IR) exposure of the wearer, comprising:
detecting IR radiation levels to which the wearer is exposed via a wearable device worn by the wearer, said wearable device comprising an IR sensor to yield IR radiation information; and
transmitting said IR radiation information to said external computing device.

20. The method of claim 17, further comprising monitoring ambient light exposure of the wearer, comprising:
detecting ambient light levels to which the wearer is exposed via a wearable device worn by the wearer, said wearable device comprising an ambient light sensor to yield ambient light information; and
transmitting said ambient light information to said external computing device.

21. A method of monitoring ultraviolet ("UV") exposure of a wearer, comprising:
detecting UV radiation levels to which the wearer is exposed via a wearable device worn by the wearer, said wearable device comprising a UV sensor to yield UV radiation information;
transmitting the UV radiation information to an external computing device;
receiving through a user interface the wearer's skin type and sunscreen protection factor information for the wearer; and
presenting on a display of the external computing device the wearer's real-time UV index value and the wearer's daily cumulative percentage of minimal erythema dose based upon the UV radiation information, skin type, and sunscreen protection factor information,
wherein said cumulative percentage of minimal erythema dose is determined by:
filtering said real-time UV index value to select a peak exposure dosage during a given period of time to yield a filtered UV index value;
adjusting said filtered UV index value based upon detected orientation of said wearable device for said period of time to yield an adjusted UV index value; and
calculating said minimal erythema dose (tE) according to:

$$t_E = \frac{4000}{60} \frac{MEDF \cdot SPF}{UVI}$$

wherein MEDF is the wearer's skin type, SPF is an adjusted SPF value that is a percentage of the sun protection factor information entered via the user interface, and UVI is the adjusted UV index value; and maintaining a running total of said calculated minimal erythema dose percentage to determine said cumulative percentage of minimal erythema dose for said wearer over time.

22. The method of claim 21, further comprising alerting the user or wearer to re-apply sunscreen when the percentage of the wearer's cumulative percentage of minimal erythema dose reaches a threshold value.

23. The method of claim 21, further comprising receiving updated information through the user interface of the wearer's skin type and/or sunscreen protection factor information for the wearer.

* * * * *